United States Patent [19]

Takeuchi et al.

[11] Patent Number: 4,959,509
[45] Date of Patent: Sep. 25, 1990

[54] GROMMET ASSEMBLY FOR MAIN AND AUXILIARY WIRE HARNESSES

[75] Inventors: Hideharu Takeuchi, Aichi; Tsutomu Sakata, Mie, both of Japan

[73] Assignee: Sumitomo Wiring System, Ltd., Yokkaichi, Japan

[21] Appl. No.: 456,749

[22] Filed: Dec. 26, 1989

[30] Foreign Application Priority Data

Dec. 27, 1988 [JP] Japan ............................ 63-168484[U]

[51] Int. Cl.⁵ ........................ H01B 17/26; H02G 3/22
[52] U.S. Cl. .................................. 174/153 G; 248/56; 277/178
[58] Field of Search ............ 174/65 G, 152 G, 153 G; 16/2; 248/56; 277/178

[56] References Cited

U.S. PATENT DOCUMENTS 2,820,088  1/1958  Sperry ............................ 174/153 G

FOREIGN PATENT DOCUMENTS 52-48762  4/1977  Japan ............................... 174/153 G

*Primary Examiner*—Laramie E. Askin
*Attorney, Agent, or Firm*—Wenderoth, Lind & Ponack

[57] ABSTRACT

A grommet assembly for wire harnesses comprises a main grommet unit having a thick large diameter tubular portion and a thin small diameter tubular portion and provided with an opening in the part of a flange thereof including the thick large diameter portion and an auxiliary grommet unit having a thick large diameter tubular portion and a thin small diameter tubular portion and adapted to be fitted into the opening of the main grommet unit. A main wire harness is put through the main grommet unit, while an auxiliary wire harness is put through the auxiliary grommet unit. A hard plate is embedded in the part of the flange confronting the outer periphery of the opening.

1 Claim, 3 Drawing Sheets

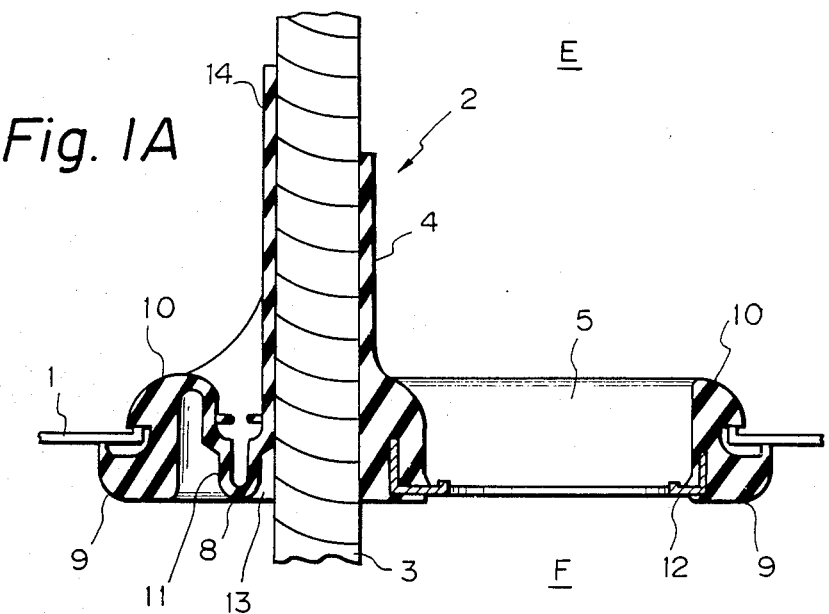
Fig. IA
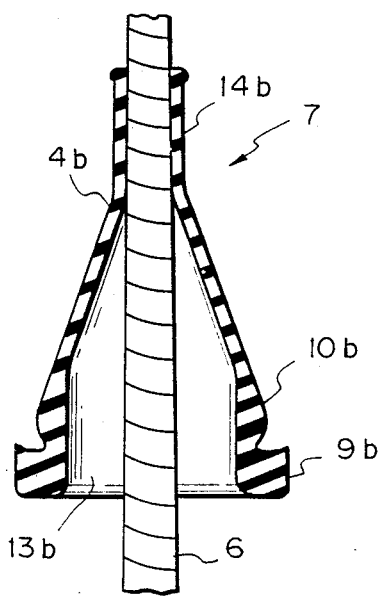
Fig. IB

GROMMET ASSEMBLY FOR MAIN AND AUXILIARY WIRE HARNESSES

BACKGROUND OF THE INVENTION:

1. Field of the Invention

The present invention relates to a grommet assembly for protecting main and auxiliary wire harnesses against damage which is possible when the wire harnesses are put through a panel of an automotive vehicle so as to be connected to electric components equipped on the automotive vehicle, as well as for preventing water and noise from entering the passenger compartment from the engine compartment of the automotive vehicle.

2. Prior Art

The wire harness-holding portion of a conventional grommet of the type adapted to function to prevent water and noise from entering the inside of the passenger compartment of an automotive vehicle is constituted by a small diameter tubular portion. The Japanese Utility Model Lain-Open No. 134824/1983 discloses a grommet adapted to be used when a plurality of wire harnesses are put through a panel of the passenger compartment. This grommet was contrived in order to meet the current growing tendency in the automotive industries that more and more electric parts such as cassette players or the like are equipped on automotive vehicles as optional equipment in the wake of the development of electronics in the automotive industries. In this grommet, in addition to a portion through which a main wire harness is put, a portion through which an auxiliary wire harness for an optional electric part is put is also formed.

To be specific, the grommet disclosed in the above Japanese document is intended to be used at a certain process of the production line to fix together a general purpose main wire harness and an auxiliary wire harness for an optional electric part, which are separately produced.

FIGS. 4 and 5 show a conventional grommet 2' that is fitted in a fixing hole formed in a panel 1 in the direction from the engine compartment side toward the passenger compartment side. In this conventional grommet 2', alongside of a portion 4' through which a main wire harness 3 is put before the shipment from a factory, at least one portion 4a is provided through which an auxiliary wire harness for an optional electric part can pass. This auxiliary wire harness putting-through portion 4a is formed into a conical hollow projection so as to provide the proper sealing efficiency. When an auxiliary wire harness 6 (FIG. 5) for an optional electric part is put through this portion of the grommet 2', the conical hollow projection is cut at a desired position A in such a manner as to produce a small diameter tubular portion 14a the inside diameter of which coincides with the oustide diameter of the auxiliary wire harness 6, whereby water and noise are prevented from entering the passenger compartment of an automotive vehicle.

However, with this conventional grommet, the main wire harness 3 is first put through the main wire harness putting-through portion 4' thereof, and the grommet 2' is then fitted in a fixing hole provided in a panel. Afterwards, the auxiliary wire harness putting-through portion 4a is cut at a desired position along the length thereof so as to produce the small diameter tubular portion 14a, which is then press expanded so as to allow the auxiliary wire harness 6 to be put therethrough.

As is clear from the above, a special tool is needed to expand the small diameter tubular portion 14a of the auxiliary wire harness putting-through portion 4a in order to allow the auxiliary wire harness 6 (FIG. 5) to be put therethrough after the grommet in which only the main wire harness 3 extending through the main wire harness putting-through portion 4' has been fitted in a hole provided in the panel of an automotive vehicle. This is very difficult to be achieved due to the limited space of the engine compartment of an automotive vehicle.

SUMMARY OF THE INVENTION:

An object of the present invention is to provide a novel grommet assembly for wire harnesses that can solve the above-mentioned problems inherent in the conventional grommet.

A grommet assembly for wire harnesses according to the present invention comprises a main grommet unit provided with a portion through which a main wire harness is put, and this main wire harness putting-through portion is constituted by a thick large diameter tubular portion and a thin small diameter tubular portion. An opening is formed in the part of a flange portion of the main grommet unit which includes the large diameter tubular portion so that a separate grommet unit also comprising a thick large diameter tubular portion and a thin small diameter tubular portion is fitted therein, and a hard plate is embedded in the part of the flange portion which confronts the outer periphery of the opening.

In this construction, the main grommet unit in which a main wire harness extends through the wire harness putting-through portion thereof is first fitted in a hole provided in the panel of an automotive vehicle, and thereafter the auxiliary grommet unit in which an auxiliary wire harness extends through the wire harness putting-through portion thereof is then fitted into the opening formed in the main grommet unit that is already fixed in the panel. Thus, the present invention facilitates the mounting of an auxiliary wire harness only by fitting the auxiliary grommet unit with an auxiliary wire harness into the opening of the main grommet unit that is already fitted in the panel between the engine and passenger compartments, and thus obviates the necessity of using a special tool in order to expand the auxiliary wire harness putting-through portion of the grommet assembly, which is experienced with the conventional grommet.

BRIEF DESCRIPTION OF THE DRAWINGS:

FIG. 1A is a vertical sectional view of a main grommet unit of a grommet assembly for wire harnesses according to one embodiment of the present invention;

FIG. 1B is a vertical view of an auxiliary grommet unit according to the present invention;

Figure 2:
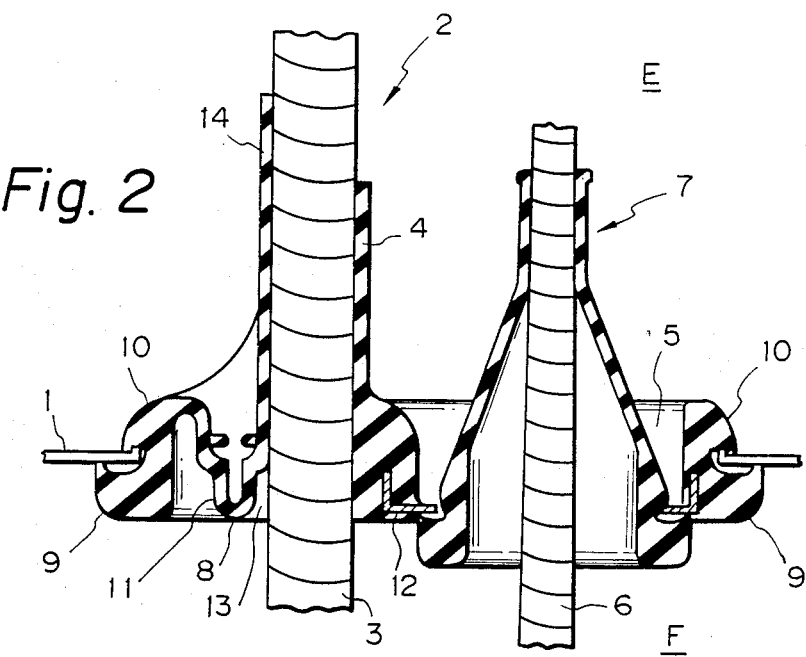
FIG. 2 is a vertical view of the entire grommet assembly showing a state in which the auxiliary grommet unit is fitted into the opening of the main grommet unit.
Figure 3:
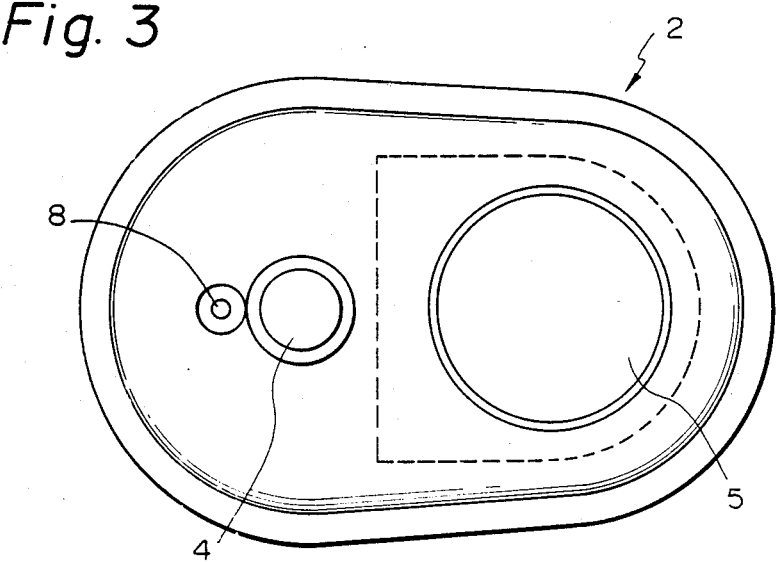
FIG. 3 is a plan view of the main grommet unit shown in FIG. 1A.
Figure 4:
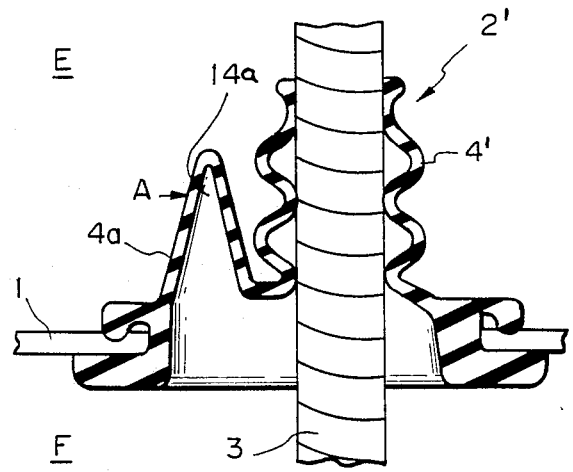
FIG. 4 is a vertical view of a conventional grommet.
Figure 5:
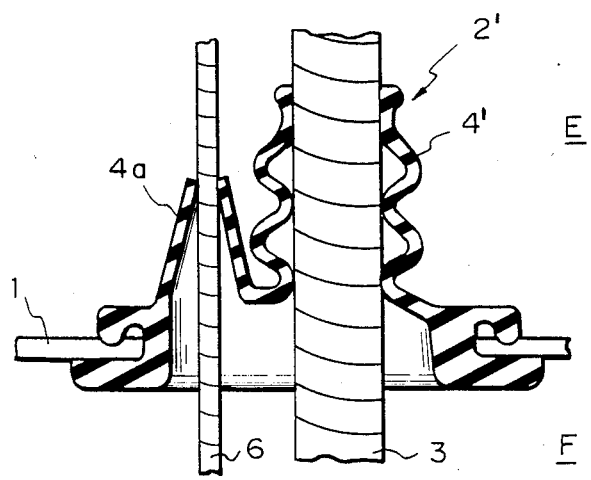
FIG. 5 is a vertical view showing a state in which both main and auxiliary wire harnesses are put through the conventional grommet.

DETAILED DESCRIPTION OF THE INVENTION:

Referring to the accompanying drawings, one embodiment of a grommet assembly for wire harnesses according to the present invention will be described in detail. FIGS. 1 to 3 show one embodiment of the present invention. The configuration of the invention will firstly be described. As shown in FIG. 1A, a main grommet unit 2 has a portion 4 through which a main wire harness is put comprising a thick large diameter tubular portion 13 and a thin small diameter tubular portion 14, and a flange 9 including the large diameter tubular portion 13. The flange 9 is thick, and an opening 5 is formed therein. Reference numeral 10 denotes a fixing portion adapted to hold a panel 1 in cooperation with the flange 9.

An auxiliary grommet unit 7 shown in FIG. 1B has a portion 4b through which an auxiliary wire harness 6 is put comprising a thick large diameter tubular portion 13b and a thin small diameter tubular portion 14b, and this auxiliary grommet unit 7 is adapted to be fitted into the opening 5 of the above main grommet unit 2 after the auxiliary wire harness 6 has been put therethrough. When this takes places, a flange 9b of the auxiliary grommet unit 7 is then brought into engagement with the flange 9.

FIGS. 1A and 1B show, respectively, the main grommet unit 2 and the auxiliary grommet unit 7, which are the esential constituent elements of the present invention, and in the drawings the latter is not yet fitted into the opening 5 formed in the former. A main wire harness 3 is inserted into the passenger compartment F from the engine compartment E, and the auxiliary grommet unit 7 through which the auxiliary wire harness 6 extends is also mounted in the direction from the engine compartment E side toward the passenger compartment F side.

FIG. 2 shows a state in which the auxiliary grommet unit 7 is received in the main grommet unit 2. The main grommet unit 2 through which the main wire harness 3 extends is fitted in the panel 1 in the first stage of the production line, and the auxiliary grommet unit 7 is then fitted into the opening 5 formed in the main grommet unit 2 in the second stage. The auxiliary wire harness 6 that is put through the auxiliary grommet unit 7 in the second production stage is, for instance, a wire harness for an air bag.

The equipment such as an air bag or the like depends on the countries to which final products are shipped. Therefore, auxiliary wire harnesses for such components need to be installed separate from the main wire harness, and an arrangement to enable this is regarded as one of the most important aspects when considering the wiring of wire harnesses in an automotive vehicle.

A steel plate 12 is embedded in the part of the flange 9 confronting the outer periphery of the opening 5 formed in the main grommet unit 2 so as to facilitate securely mounting the auxiliary grommet unit 7 on the main grommet unit 2. In other words, this steel plate 12 serves to reinforce the flange 9, and the flange so reinforced in turn secures the connection between the main grommet unit 2 and the auxiliary grommet unit 7, once the latter is mounted on the former.

A hollow projection 8 provided alongside the main wire putting-through portion 4 of the main grommet unit 2 is intended to fix, for instance, an accelerator wire, a windshield washer hose or the like. In the event that this hollow projection 8 needs to be utilized, the projecting portion 11 thereof is cut off to produce a hole, through which an accelerator wire, a windshield washer hose or the like is put. In general, the wire or hose is inserted through this hollow projection 8 in the direction from the passenger compartment F side toward the engine compartment E side, which is reverse to the direction in which wire harnesses are mounted.

As is clear from the above, in the grommet assembly according to the present invention, the grommet unit with the main wire harness already put therethrough is fitted in the panel of an automotive vehicle, and afterwards, the auxiliary grommet unit with the auxiliary wire harness already put therethrough is then fitted into the opening formed in the flange of the main grommet unit.

This construction serves to obviate the necessity of expansion of the wire harness putting-through portion which has to be carried out in the limited space in the engine compartment in order to allow an auxiliary wire harness to be put therethrough, and enables wire harnesses of various types to be easily fixed. In addition, since the steel plate is embedded in the part of the flange confronting the outer periphery of the opening formed in the main grommet unit 2, the auxiliary grommet unit can securely be fixed.

What is claimed is:

1. A grommet assembly comprising a main grommet unit provided with a portion through which a main wire harness is to be put, said main grommet unit comprising a thick large diameter tubular portion and a thin small diameter tubular portion, said main grommet unit being further characterized in that an opening is formed in a part of a flange portion including said large diameter tubular portion; a separate grommet unit also comprising a thick large diameter tubular portion and a thin small diameter tubular portion fitted into said opening; and a hard plate embedded in that part of said flange portion confronting the outer periphery of said opening.

* * * * *